United States Patent
Craun

(10) Patent No.: US 10,053,594 B2
(45) Date of Patent: Aug. 21, 2018

(54) MICROGELS PREPARED USING HYBRID CROSSLINKER SYSTEMS AND COATING COMPOSITIONS HAVING MICROGELS PREPARED THEREFROM

(71) Applicant: Akzo Nobel Coatings International B.V., Arnhem (NL)

(72) Inventor: Gary Pierce Craun, Berea, OH (US)

(73) Assignee: Akzo Nobel Coatings International B.V. (NL)

(*) Notice: Subject to any disclaimer, the term of this patent is extended or adjusted under 35 U.S.C. 154(b) by 0 days.

(21) Appl. No.: 14/771,635

(22) PCT Filed: Mar. 11, 2014

(86) PCT No.: PCT/EP2014/054624
§ 371 (c)(1),
(2) Date: Aug. 31, 2015

(87) PCT Pub. No.: WO2014/139972
PCT Pub. Date: Sep. 18, 2014

(65) Prior Publication Data
US 2016/0009943 A1    Jan. 14, 2016

Related U.S. Application Data

(60) Provisional application No. 61/781,343, filed on Mar. 14, 2013.

(30) Foreign Application Priority Data

May 24, 2013   (EP) .................................. 13169100

(51) Int. Cl.
| | | |
|---|---|---|
| *C08L 63/00* | (2006.01) | |
| *C09D 133/12* | (2006.01) | |
| *C09D 133/06* | (2006.01) | |
| *C09D 201/08* | (2006.01) | |
| *C08G 18/80* | (2006.01) | |
| *C08J 3/24* | (2006.01) | |

(52) U.S. Cl.
CPC ....... *C09D 133/12* (2013.01); *C08G 18/8074* (2013.01); *C08J 3/243* (2013.01); *C09D 133/064* (2013.01); *C09D 201/08* (2013.01)

(58) Field of Classification Search
CPC .............. C09D 133/064; C09D 133/12; C09D 201/08; C08G 18/8074; C08J 3/243

USPC .......................................... 523/400; 525/523
See application file for complete search history.

(56) References Cited

U.S. PATENT DOCUMENTS

| | | |
|---|---|---|
| 3,215,756 A | 11/1965 | Lombardi et al. |
| 4,212,781 A | 7/1980 | Evans et al. |
| 4,414,357 A | 11/1983 | Wright et al. |
| 4,546,014 A | 10/1985 | Gajria et al. |
| 4,897,434 A | 6/1990 | Shimada et al. |
| 5,407,976 A | 4/1995 | Uhlianuk |
| 5,464,885 A | 11/1995 | Craun |
| 5,508,325 A | 4/1996 | Craun |
| 5,532,297 A * | 7/1996 | Woo .............. C08F 287/00 523/406 |
| 5,554,671 A | 9/1996 | Craun et al. |
| 5,576,360 A | 11/1996 | Craun et al. |
| 5,576,361 A | 11/1996 | Craun |
| 5,733,970 A | 3/1998 | Craun |
| 5,877,239 A | 3/1999 | Craun et al. |
| 5,942,563 A | 8/1999 | DeGraaf |
| 6,034,157 A | 3/2000 | Craun et al. |
| 2005/0272861 A1 | 12/2005 | Qiao et al. |
| 2006/0128887 A1* | 6/2006 | Muller .............. C08F 265/04 524/832 |

FOREIGN PATENT DOCUMENTS

| | | |
|---|---|---|
| CA | 2280409 A1 | 2/2001 |
| EP | 0684294 A1 | 11/1995 |
| EP | 1055689 A1 | 11/2000 |
| SU | 1126580 A | 11/1984 |
| WO | 98/50452 A2 | 11/1998 |
| WO | 2012/044954 A | 4/2012 |

OTHER PUBLICATIONS

European Search Report for EP13169100.8, dated Jul. 3, 2013.
International Search Report and Written Opinion for PCT/EP2014/054624, dated Apr. 2, 2014.

* cited by examiner

*Primary Examiner* — David T Karst
(74) *Attorney, Agent, or Firm* — Alice C. Su

(57) ABSTRACT

The present invention includes coating compositions having a microgel, wherein the microgel is prepared from a carboxyl functional polymer and a hybrid crosslinker system, wherein the hybrid crosslinker system has a first crosslinker having an epoxy resin and a second crosslinker having a thermally active crosslinker.

13 Claims, No Drawings

US 10,053,594 B2

MICROGELS PREPARED USING HYBRID CROSSLINKER SYSTEMS AND COATING COMPOSITIONS HAVING MICROGELS PREPARED THEREFROM

This application is a national stage filing under 35 U.S.C. § 371 of PCT/EP2014/054624, filed Mar. 11, 2014, which claims priority to U.S. Provisional Patent Application No. 61/781,343 filed Mar. 14, 2013, and European Patent Application No. 13169100.8, filed May 24, 2013, the contents of which herein incorporated by reference to the extent not inconsistent with the present disclosure.

BACKGROUND OF THE INVENTION

1. Field of the Invention

The present invention relates to microgels, coating compositions having the microgels, methods of coating substrates with the coating compositions, and substrates coated with the coating compositions.

2. Description of Related Art

Industrial coatings are surface protective coatings applied to substrates and are typically cured or crosslinked to form continuous films for decorative and protective purposes. Protective coatings ordinarily comprise an organic polymeric binder, pigments and various additives, where the polymeric binder acts as a fluid vehicle for the pigments and imparts rheological properties to the coating. Upon curing or crosslinking, the polymeric binder hardens and functions as a binder for the pigments and provides adhesion of the dried film to the substrate.

Epoxy resins have been particularly desirable for use in protective coatings as a polymeric binder. The epoxy resins advantageously provide toughness, flexibility, adhesion and chemical resistance to the resulting coating compositions. Water-dispersed coating compositions containing epoxy resins are highly desirable as packaging coating compositions for food and beverage substrates, and are particularly useful for the interior surfaces of such substrates.

Commonly-owned U.S. Pat. No. 5,508,325 describes coating compositions having microgels prepared by crosslinking a carboxyl-functional polymer with an epoxy resin. Commonly-owned U.S. Pat. Nos. 5,733,239 and 5,877,239 also relate to microgel technology. The entire contents of these three patents are incorporated herein by reference.

SUMMARY OF THE INVENTION

Coating compositions formed from epoxy resins have been used to coat packaging and containers for foods and beverages. Although the weight of scientific evidence, as interpreted by the major global regulatory food safety agencies in the US, Canada, Europe, and Japan, shows that the levels of bisphenol A consumers are exposed to with current commercial epoxy based coatings is safe, some consumers and brand owners continue to express concern, and a coating that does not contain bisphenol A or any other endocrine disruptor is desirable.

It has now been found that coating compositions with a high solids content and minimal or no gelling can be prepared from a microgel prepared from a carboxyl functional polymer and a hybrid crosslinker system, wherein the hybrid crosslinker system comprises a) a first crosslinker comprising an epoxy resin, and b) a second crosslinker comprising a thermally active crosslinker. The first crosslinker can be used to crosslink the carboxyl functional polymer. The first crosslinker and the second crosslinker can be used to crosslink the microgel during thermal cure on metal. A microgel is a small particle size crosslinked gel particle suspended in water.

The microgel may be formed with or without bisphenol A. The present invention relates such microgels, coating compositions having the microgels, methods of coating substrates with the coating compositions, and substrates coated with the coating compositions. The microgels of the invention can be used in the preparation of coating compositions suitable, inter alia, as protective coatings including packaging coatings for food and beverage packaging and containers.

DETAILED DESCRIPTION OF THE INVENTION

As used in the afore-discussed embodiments and other embodiments of the disclosure and claims described herein, the following terms generally have the meaning as indicated, but these meanings are not meant to limit the scope of the invention if the benefit of the invention is achieved by inferring a broader meaning to the following terms.

The present invention includes substrates coated at least in part with a coating composition of the invention and methods for coating the substrates. The term "substrate" as used herein includes, without limitation, cans, metal cans, packaging, containers, receptacles, or any portions thereof used to hold, touch or contact any type of food or beverage. Also, the terms "substrate", "food can(s)", "food containers" and the like include, for non-limiting example, "can ends", which can be stamped from can end stock and used in the packaging of beverages.

It has now been found that coating compositions with a high solids content and minimal or no gelling can be prepared from a microgel. A high solids content is important to help achieve a proper film thickness. A microgel of the invention may be prepared from a carboxyl functional polymer and a hybrid crosslinker system, wherein the hybrid crosslinker system comprises a) a first crosslinker comprising an epoxy resin, and b) a second crosslinker comprising a thermally active crosslinker. The thermally active crosslinker of the second crosslinker is not activated until the coating composition is heated. During heating, solvents evaporate and the microgel cures and reacts with the thermally active crosslinker. However, since the thermally active crosslinker is present while the first crosslinker converts the carboxyl functional polymer into a microgel, its presence helps provide a higher solids content.

The hybrid crosslinker system may crosslink the microgel with the carboxyl functional polymer. In some embodiments, the carboxyl functional polymer can be prepared by polymerizing a mixture of ethylenically unsaturated monomers. Ethylenically unsaturated monomers may contain carbon to carbon double bond unsaturation and may include without limitation a vinyl monomer, a styrenic monomer, an acrylic monomer, an allylic monomer, an acrylamide monomer, a carboxyl functional monomer, or a mixture thereof. Vinyl monomers may include without limitation vinyl esters such as vinyl acetate, vinyl propionate and similar vinyl lower alkyl esters, vinyl halides, vinyl aromatic hydrocarbons such as styrene and substituted styrenes, vinyl aliphatic monomers such as alpha olefins and conjugated dienes, and vinyl alkyl ethers such as methyl vinyl ether and similar vinyl lower alkyl ethers. Acrylic monomers may include without limitation lower alkyl esters of acrylic or methacrylic acid having an alkyl ester chain from one to twelve carbon atoms as well as aromatic derivatives of acrylic and methacrylic acid. Acrylic monomers may include without limitation methyl, ethyl, butyl and propyl acrylates and methacrylates, 2-ethyl hexyl acrylate and methacrylate, cyclohexyl, decyl and isodecyl acrylates and methacrylates, and similar various acrylates and methacrylates. Carboxyl functional monomers may include without limitation acrylic acid and methacrylic acid, and unsaturated dicarboxylic acids such as maleic acid and fumaric acid, hydroxy ethyl (meth)acrylates. The ethylenically unsaturated monomer component may also include without limitation amide monomers such as acrylamides, N-methylol monomers such as N-methylol acrylamide. Carboxyl functionality can be used as a means to aid dispersion into water.

The carboxyl functional polymer may be prepared by polymerization of the ethylenically unsaturated monomers in the presence of an initiator. Suitable initiators include for non-limiting example azo compounds such as for non-limiting example, 2,2'-azo-bis(isobutyronitrile), 2,2'-azo-bis (2,4-dimethylvaleronitrile), and 1-t-butyl-azocyanocyclohexane), hydroperoxides such as for non-limiting example, t-butyl hydroperoxide and cumene hydroperoxide, peroxides such as for non-limiting example, benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, 1,1,3,3-tetramethylbutyl-peroxy-2-ethylhexanoate, and t-butylperoxy pivilate, peresters such as for non-limiting example, t-butyl peracetate, t-butyl perphthalate, and t-butyl perbenzoate, as well as percarbonates, such as for non-limiting example, di(1-cyano-1-methylethyl)peroxy dicarbonate, perphosphates, t-butyl peroctoate, and the like, as well as combinations thereof. In some embodiments, the initiator may be present in an amount from about 0.1 to about 15%, and alternatively from about 1 to about 5%, based on the weight of the monomer mixture used to form the carboxyl functional polymer.

The carboxyl functional polymer may be prepared by non-aqueous polymerization of the ethylenically unsaturated monomers in a solvent. Solvents such as xylene, benzene, ethyl benzene, toluene, an alkoxy alkanol, methanol, ethanol, propanol, butanol and the like, ethylene glycol monobutyl ether, ethylene glycol monohexyl ether, ethylene glycol monobutyl ether acetate and the like, hexane, a mineral spirit and the like, are suitable. For dispersion into water, the solvent should be at least partially water-soluble.

The ethylenically unsaturated monomers may be polymerized to form the carboxyl functional polymer by heating the monomer mixture in the presence of the initiator at a reaction temperature from about 30° C. to about 200° C., although the temperature may be adjusted within a relatively wide range to accommodate the reactivity of the mixture. After the monomers are added to form the carboxyl functional polymer, the reaction mixture is normally held for up to three hours at the reaction temperature to complete the monomer conversions. The carboxyl-functional polymer may contain at least about 5% of a polymerized acid monomer based on the total weight of monomers.

In certain embodiments, the coating composition may comprise from about 20 to about 95 wt % of the microgel. The carboxyl functional monomers present in the carboxyl functional polymer may comprise from about 3 to about 40 wt % of the carboxyl functional polymer. The carboxyl functional polymer may have an acid number of about 30 to about 400 mg KOH/gram. The microgel may also contain about 0.5 to about 50 wt % of the first crosslinker, and about 1 to about 80 wt % of the second crosslinker.

The first crosslinker may include one or more epoxy resins. The first crosslinker forms a microgel by reacting with carboxyl groups in the carboxyl functional polymer. The epoxy resin may be a conventional epoxy resin used in the art, such as without limitation, an aliphatic or an aromatic epoxy resin, such as a polyglycidyl ether of bisphenol-A with a 1,2-epoxy equivalency of from about 1.3 to about 2 and an epoxy equivalent weight of about 150 to 500; an aliphatic epoxy resin such as a diglycidyl ether or polyglycidyl ether of materials like 1,4-butane diol, 1,4-cyclohexane dimethanol, sorbitol, polypropylene glycol, propylene glycol, dipropylene glycol, ethylene glycol, diethylene glycol, polyethylene glycol, a fatty alcohol, a glycol, a dimer diol, and the like, as well an epoxy ester such as the reaction product of a diglycidyl ether with a diacid, and the like, as well as a mixture thereof. In some embodiments, the number average molecular weight of the epoxy resin is from about 150 to about 2,000.

The second crosslinker may include a thermally active crosslinker, a non-thermally active crosslinker, or a mixture thereof. The thermally active crosslinker may aid in crosslinking the film during heating. Thermally active crosslinker may include without limitation a phenolic compound, such as a reaction product of phenol or a substituted phenol with formaldehyde; urea formaldehyde; an oxazoline compound, such as 1,3-phenylene-bis-oxazoline and the like; a blocked isocyanate, such as the reaction product of isophorone diisocyanate (as a monomer or a polymer) with caprolactam; a melamine compound, such as hexamethoxy methyl melamine; a benzoguanamine compound; any other thermally active crosslinker, or a mixture of the foregoing. The second crosslinker may be a mixture of thermally active crosslinkers. Thermally active crosslinkers will crosslink the coating at heating (bake) temperatures ranging from about 120 to about 275° C.

In certain embodiments, the first crosslinker is present in an amount from about 0.5 to about 50 wt % of the microgel or from about 2 to about 10 wt % of the microgel. In certain embodiments, the second crosslinker is present in an amount from about 1 to about 80 wt % of the microgel or from about 5 to about 40 wt % of the microgel.

The microgel of the invention may be prepared by mixing the carboxyl functional polymer with the hybrid crosslinker system and inverting the mixture into water. Direct or reverse let down procedures can be used to invert the mixture into water. Ammonia, dimethylethanol amine, triethyl amine, a tertiary amine or a combination thereof may be used as the inverting base.

In some embodiments, the microgel has a mean particle size less than 1 micron.

For spraying and the like, the coating composition may contain between about 10 to about 30 wt % polymeric solids relative to about 70 to about 90 wt % water and other volatiles. For applications other than spraying and the like, the microgel polymer can contain between about 10 to about 40 wt % polymer solids. Organic solvents can be utilized to facilitate spray or other application methods. The coating compositions of the present invention can be pigmented and/or opacified with known pigments and opacifiers. The coating compositions can be applied by conventional methods known in the coating industry, such as spraying, rolling, dipping and flow coating. After application onto the substrate, the coating composition may be thermally cured at a temperature from about 120° C. to about 275° C. for a time sufficient to complete curing as well as volatilizing any fugitive components.

For substrates intended as beverage containers, the coating compositions may be applied in some embodiments at a rate in the range from about 0.5 to about 15 milligrams of polymer coating per square inch of exposed substrate surface. In some embodiments, the water-dispersible coating is applied at a thickness between about 1 and about 25 microns

EXAMPLES

The invention will be further described by reference to the following non-limiting examples. It should be understood that variations and modifications of these examples can be made by those skilled in the art without departing from the spirit and scope of the invention.

Example 1

A polymer was prepared by heating 120 grams of butyl cellosolve and 280 grams of n-butanol to 120° C. The following compounds were added over 2 hours: 8 grams of benzoyl peroxide in 75% water, 100 grams of methacrylic acid, 140 grams of n-butyl methacrylate and 160 grams of methyl methacrylate. Next, 8 milliliters of t-butyl peroctoate was added and the mixture was held for 1 hour at 120° C. to produce an polymer mixture. The mixture was cooled.

Next, 100 grams of the polymer mixture was mixed with 35.5 grams of a phenolic resin and 5 grams of a sorbitol epoxy resin. The mixture was stirred and warmed to 60° C. Next, 9 grams of dimethylethanol amine in 20 grams of water was added. The resulting mixture was stirred for 2 minutes, followed by the addition of 146 grams of water. The resulting mixture was warmed to 90° C. and held for 1 hour to produce a microgel having 25.4% solids.

The microgel was drawn down with a #7 wire wound bar onto 80# electro tin plated steel and baked at 200° C. for 10 minutes. A clear, glossy and slightly yellow film was produced. The film had 100% adhesion (tape off), no mar after 100 MEK double rubs, a 2H pencil hardness, no failure after 60 pounds forward or reverse impact, and no blush after 1 hour in boiling water.

Example 2—Comparative Example Containing Only the First Crosslinker 100 grams of the polymer from Example 1 was combined with 5.0 grams of sorbitol epoxy resin and warmed to 60° C. 9.0 grams of dimethylethanol amine in 20 grams of water was added, then 82.5 grams of water was added. The resulting mixture was heated to 90° C. and held. The mixture gelled after 40 minutes. The solids content of the mixture was 25.4% just as Example 1.

Example 3

100 grams of the polymer from Example 1 was combined with 5.0 grams of sorbitol epoxy resin and 41.4 grams of a blocked isocyanate crosslinker (60% solids, Bayer VP-2078/2) and warmed to 60° C. 9.0 grams of dimethylethanol amine in 20 grams of water was added, then 140 g water was added. The resulting mixture was heated to 90° C. and held for 1 hour. The resulting product was a stable microgel with a solids content of 25.4%.

What is claimed is:

1. A coating composition comprising
a bisphenol A-free microgel formed from the reaction of
a carboxyl functional polymer and a first crosslinker comprising an epoxy resin,
and
a second crosslinker comprising a thermally active crosslinker capable of crosslinking the coating composition at heating temperatures ranging from 120° C. to 275° C., wherein the second crosslinker is present during the formation of the bisphenol A-free microgel.

2. The coating composition of claim 1, wherein the microgel has a mean particle size less than 1 micron.

3. The coating composition of claim 1, wherein the carboxyl functional polymer is present in an amount from about 20 to about 95 wt % of the microgel.

4. The coating composition of claim 1, wherein the first crosslinker is present in an amount from about 0.5 to about 50 wt % of the microgel.

5. The coating composition of claim 1, wherein the second crosslinker is present in an amount from about 1 to about 80 wt % of the microgel.

6. The coating composition of claim 1, wherein the second crosslinker comprises a phenolic compound, urea formaldehyde, an oxazoline compound, a blocked isocyanate, a melamine compound, or a mixture of the foregoing.

7. The coating composition of claim 1, wherein the carboxyl functional polymer has an acid number of about 40 to about 400 mg KOH/gram.

8. A substrate coated with the coating composition of claim 1.

9. A coating composition comprising
a bisphenol A-free microgel formed from the reaction of
a carboxyl functional polymer and a first crosslinker comprising an epoxy resin
and
a second crosslinker comprising a thermally active crosslinker, which is capable of crosslinking the coating composition at heating temperatures ranging from 120° C. to 275° C., wherein the second crosslinker comprises a phenolic compound which is the reaction product of phenol or a substituted phenol with formaldehyde, urea formaldehyde, an oxazoline compound, a blocked isocyanate, a melamine compound, or a mixture thereof, and wherein the second crosslinker is present during the formation of the bisphenol A-free microgel.

10. The coating composition of claim 9, wherein the microgel has a mean particle size less than 1 micron.

11. The coating composition of claim 9, wherein the first crosslinker is present in an amount from about 0.5 to about 50 wt % of the microgel.

12. The coating composition of claim 9, wherein the second crosslinker is present in an amount from about 1 to about 80 wt % of the microgel.

13. The coating composition of claim 9, wherein the carboxyl functional polymer has an acid number of about 40 to about 400 mg KOH/gram.

* * * * *